(12) United States Patent
Horng et al.

(10) Patent No.: US 6,759,786 B2
(45) Date of Patent: Jul. 6, 2004

(54) STATOR OF A BRUSHLESS DIRECT CURRENT MOTOR AND A METHOD FOR MAKING IT

(75) Inventors: Alex Horng, Kaohsiung (TW); Ching-Shen Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 117 days.

(21) Appl. No.: 09/964,344

(22) Filed: Sep. 28, 2001

(65) Prior Publication Data

US 2003/0062799 A1 Apr. 3, 2003

(51) Int. Cl.⁷ .............................. H02K 1/18; H02K 1/12
(52) U.S. Cl. ..................................... 310/257; 310/49 R
(58) Field of Search ................................ 310/254, 256, 310/257, 49 R, 67 R, 263; 336/83, 84 R, 84 C, 84 M, 90, 92, 199, 208

(56) References Cited

U.S. PATENT DOCUMENTS

| | | | | | |
|---|---|---|---|---|---|
| 4,244,099 | A | * | 1/1981 | Haydon | ........................ 29/596 |
| 4,381,465 | A | * | 4/1983 | Renkl et al. | ............... 310/49 R |
| 4,891,567 | A | * | 1/1990 | Fujitani et al. | ............. 318/254 |
| 4,987,331 | A | * | 1/1991 | Horng | ......................... 310/254 |
| 5,847,485 | A | * | 12/1998 | Suzuki et al. | ................ 310/257 |
| 5,917,262 | A | * | 6/1999 | Huang et al. | ................ 310/254 |
| 5,945,765 | A | * | 8/1999 | Chen | ........................... 310/257 |
| 6,441,531 | B1 | * | 8/2002 | Horng et al. | ............... 310/216 |
| 6,466,119 | B1 | * | 10/2002 | Drew | .......................... 335/306 |

* cited by examiner

Primary Examiner—Burton S. Mullins
Assistant Examiner—Judson H. Jones
(74) Attorney, Agent, or Firm—Bacon & Thomas, PLLC

(57) ABSTRACT

A method for making a stator of a brushless direct current motor, includes the steps of: winding a coil set to predetermined turns, thereby forming a ring body having a central hole, and performing an insulation process; mounting at least two pole plates on two end faces of the coil set respectively, the pole face and the magnetically conducting plates of each pole plate encompassing the inner and outer periphery of the coil set respectively, and a wiring head of the coil set being drawn outside of the pole plate; and mounting a combination member on the magnetically conducting rings (or plates) of each pole plate, thereby forming a stator. The pole faces of each pole plate may be induced with the permanent magnet of the rotor.

4 Claims, 6 Drawing Sheets

STATOR OF A BRUSHLESS DIRECT CURRENT MOTOR AND A METHOD FOR MAKING IT

BACKGROUND OF THE INVENTION

1. Field of the Invention

The present invention relates to a stator of a brushless direct current motor and a method for making it, wherein the stator of the brushless direct current motor may be processed and manufactured conveniently.

2. Description of the Related Art

A conventional stator combination structure of a miniature heat-sink fan in accordance with the prior art shown in FIG. 1 comprises a stator coil 90, upper and lower pole plates 91 and 92, a circuit board 93, and a housing 94. A metallic shaft tube 95 having a proper outer diameter passes through central holes of the stator coil 90, the upper and lower pole plates 91 and 92, and the circuit board 93, so that they are combined integrally. Then, the bottom of the metallic shaft tube 95 is pressed in the central column hole 96 of the housing 94. The outer diameter of the metallic shaft tube 95 is provided with multiple sections, and has a top end formed with an annular lip 951, a mediate portion formed with an enlarged diameter portion 952, and a bottom 953. The stator coil 90 is provided with a central hole having a diameter slightly greater than the outer diameter of the enlarged diameter portion 952 of the metallic shaft tube 95. The upper pole plate 91 is provided with a central hole having a diameter slightly smaller than the outer diameter of the annular lip 951 of the metallic shaft tube 95. The lower pole plate 92 is provided with a central hole having a diameter slightly smaller than the outer diameter of the bottom 953 of the metallic shaft tube 95. The circuit board 93 is provided with a central hole having a diameter slightly smaller than the outer diameter of the bottom 953 of the metallic shaft tube 95. The upper pole plate 91 is pressed on the annular lip 951 of the metallic shaft tube 95 in a forcibly press manner. Then, the stator coil 90 is mounted on the enlarged diameter portion 952 of the metallic shaft tube 95 through the bottom 953 of the metallic shaft tube 95. Then, the lower pole plate 92 and the circuit board 93 are pressed on the bottom 953 of the metallic shaft tube 95, so that the stator coil 90 is clamped by the upper and lower pole plates 91 and 92 to be fixed on the enlarged diameter portion 952 of the metallic shaft tube 95 by the diameter difference of the outer diameter of the metallic shaft tube 95. The outer diameter of the bottom 953 of the metallic shaft tube 95 is slightly greater than the inner diameter of the central column hole 96 of the housing 94.

In such a stator of the conventional brushless direct current motor, the metallic shaft tube 95 needs to be formed with three sections of different diameters, and the upper and lower pole plates 91 and 92 and the circuit board 93 need to be respectively formed with an inner hole whose inner diameter forms a proper tolerance with the outer diameter of the metallic shaft tube 95. Thus, fabrication of the stator is more inconvenience. In addition, the upper and lower pole plates 91 and 92 each only have a smaller thickness. Thus, the sensing area of the upper and lower pole plates 91 and 92 and the rotor is reduced relatively. Thus, the stator cannot enhance the rotational torque of the rotor.

The stator structure of another conventional brushless direct current motor in accordance with the prior art shown in FIG. 2 comprises a stator 80 wound with a coil 803. The upper and lower ends of the stator 80 are provided with columns 801 and 802 for combining and positioning the upper and lower pole plates 81 and 82 and the circuit board 83. A metallic shaft tube 84 whose outer diameter is greater than the diameter of the central holes respectively provided by the stator 80, the upper and lower pole plates 81 and 82 and the circuit board 83, may be pressed into the central holes in a forcibly press manner. The metallic shaft tube 84 has a protruding annular lip 841 to prevent detachment, and the rotation shaft 851 of the rotor 85 may be pivoted on the metallic shaft tube 84 to rotate. In such a stator of the conventional brushless direct current motor, the fabrication also uses the difference of the larger and the smaller diameters to combine in a forcibly press manner, and also needs combination of the columns 801 and 802 provided by the upper and lower ends of the stator 80 with the upper and lower pole plates 81 and 82 and the circuit board 83. Thus, the fabrication of the stator is more inconvenience. In addition, the upper and lower pole plates 81 and 82 each only have a smaller thickness. Thus, the sensing area of the upper and lower pole plates 81 and 82 and the annular permanent magnet 852 of the rotor 85 is small. Thus, the stator cannot enhance the rotational torque of the rotor.

SUMMARY OF THE INVENTION

The primary objective of the present invention is to provide a method for making a stator of a brushless direct current motor, wherein the stator may be processed and manufactured conveniently.

A secondary objective of the present invention is to provide a stator of a brushless direct current motor, wherein the upper and lower pole plates of the stator and the annular permanent magnet of the rotor may have a larger sensing area, and have a larger magnetically conducting passage. Thus, the stator may enhance the rotational torque of the rotor.

In accordance with the present invention, there is provided a method for making a stator of a brushless direct current motor, includes the steps of: winding a coil set to predetermined turns, thereby forming a ring body having a central hole, and performing an insulation process; mounting at least two pole plates on two end faces of the coil set respectively, the pole face and the magnetically conducting plates of each pole plate encompassing the inner and outer periphery of the coil set respectively, and a wiring head of the coil set being drawn outside of the pole plate; and mounting a combination member on the magnetically conducting rings (or plates) of each pole plate, thereby forming a stator. The pole faces of each pole plate may be induced with the permanent magnet of the rotor.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
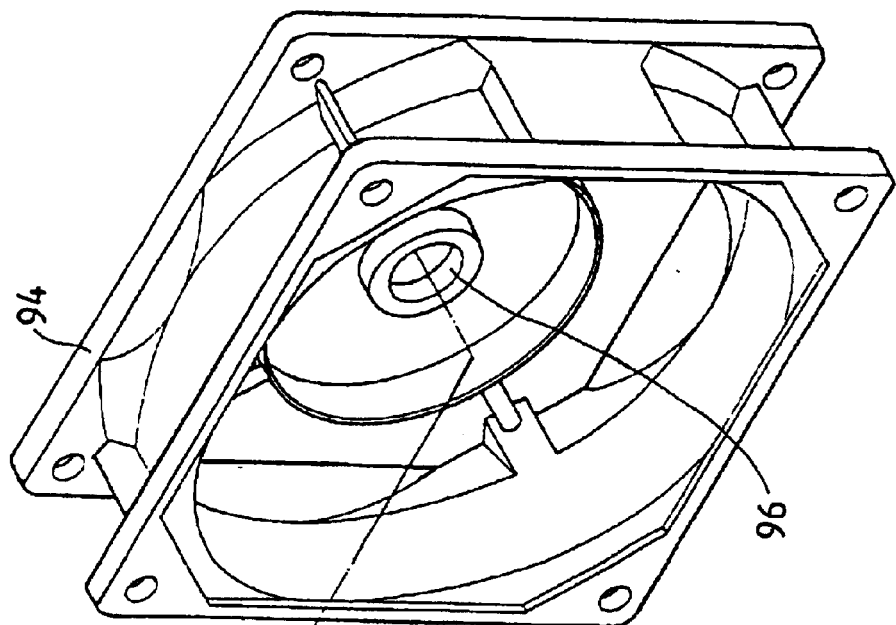
FIG. 1 is an exploded perspective view of a conventional stator structure in accordance with the prior art.
Figure 1:
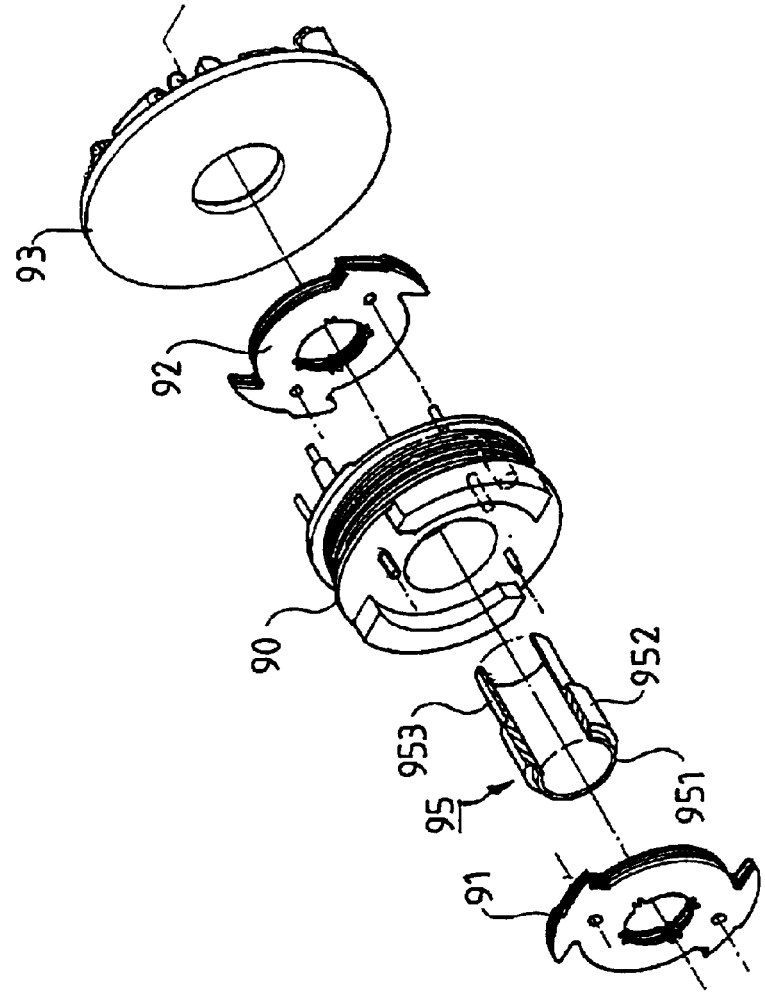
Figure 2:
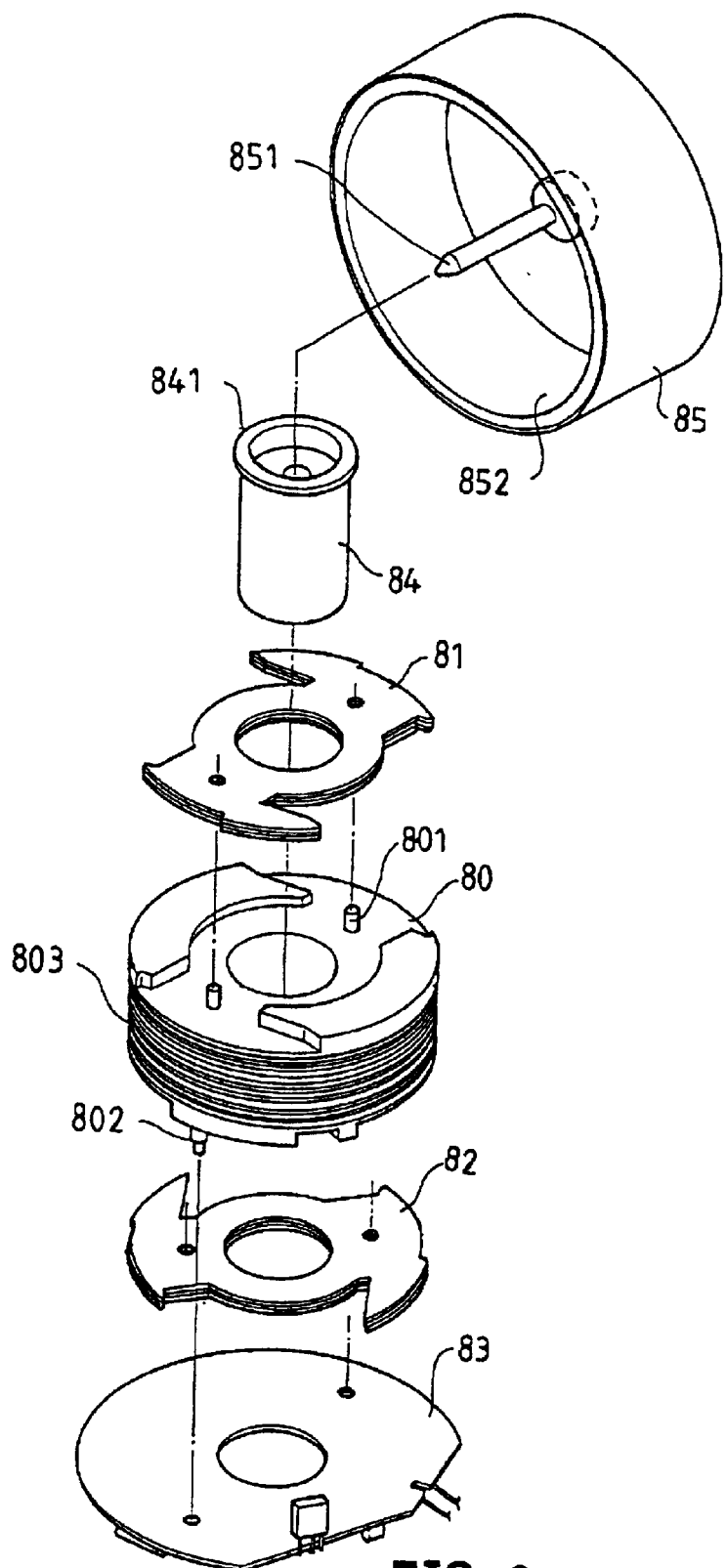
FIG. 2 is an exploded perspective view of a conventional stator structure in accordance with the prior art.
Figure 3:
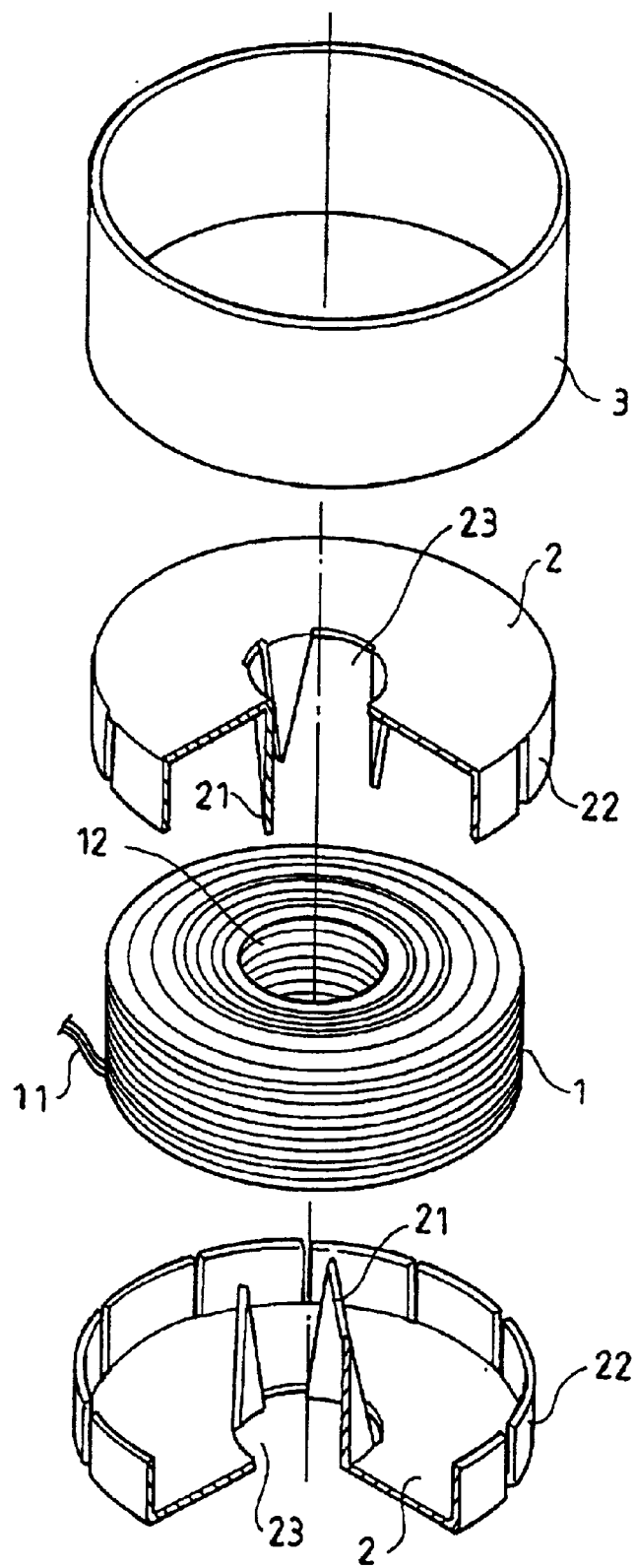
FIG. 3 is an exploded perspective view of a stator of a brushless direct current motor in accordance with a first embodiment of the present invention.

Referring to the drawings and initially to FIG. 3, a stator structure of a brushless direct current motor in accordance with a first embodiment of the present invention primarily comprises a coil set 1, at least two pole plates 2, and a combination member 3.

The coil set 1 may be a conventional metallic wire that is wound and processed on a winding machine, thereby forming a ring body having a central hole 12. The coil set 1 may be preferably formed or coated with an insulating layer in an impregnated and plated manner. In addition, the coil set 1 has a wiring head 11 for connecting the electric power.

The at least two pole plates 2 are made of magnetically conducting material, and may be combined on the two end faces of the coil set 1. Each pole plate 2 has pole faces 21 and magnetically conducting rings 22. In the preferred embodiment, each pole face 21 is located adjacent to the circumference of the smaller diameter of the center of the pole plate 2. The pole faces 21 of the upper and lower pole plates 2 are arranged in a staggered manner, so as to form a central hole 23. The sensing magnet of a rotor may be placed into the central hole 23, to induce with the pole face 21 to rotate. The magnetically conducting rings 22 are arranged on the outer circumference of the pole plate 2.

The combination member 3 may preferably be made of magnetically conducting material, and may be closely combined with the magnetically conducting rings 22 of the upper and lower pole plates 2, so that the pole plate 2 may be fixed. In addition, the combination member 3 may also strengthen the magnetically conducting effect.

Figure 4:
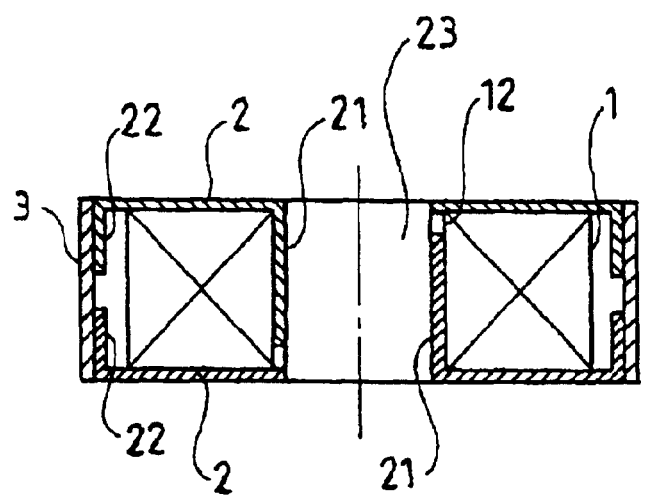
FIG. 4 is a cross-sectional assembly view of the stator of a brushless direct current motor as shown in FIG. 3.

The stator of the present preferred embodiment may be made by the following steps:

(1) The coil set 1 is wound to predetermined turns, thereby forming a ring body having a central hole 12, and may be performed by an insulation process;

(2) The two pole plates 2 are respectively mounted on the two end faces of the coil set 1, the pole face 21 of each pole plate 2 is mounted in the central hole 12 of the coil set 1, the magnetically conducting rings 22 of each pole plate 2 encompass the outer circumference of the coil set 1, and the wiring head 11 of the coil set 1 is drawn outside of the pole plate 2;

(3) The combination member 3 is mounted on the outside of each pole plate 2, and is closely combined with the magnetically conducting rings 22 of each pole plate 2, thereby forming a stator as shown in FIG. 4.

Figure 5:
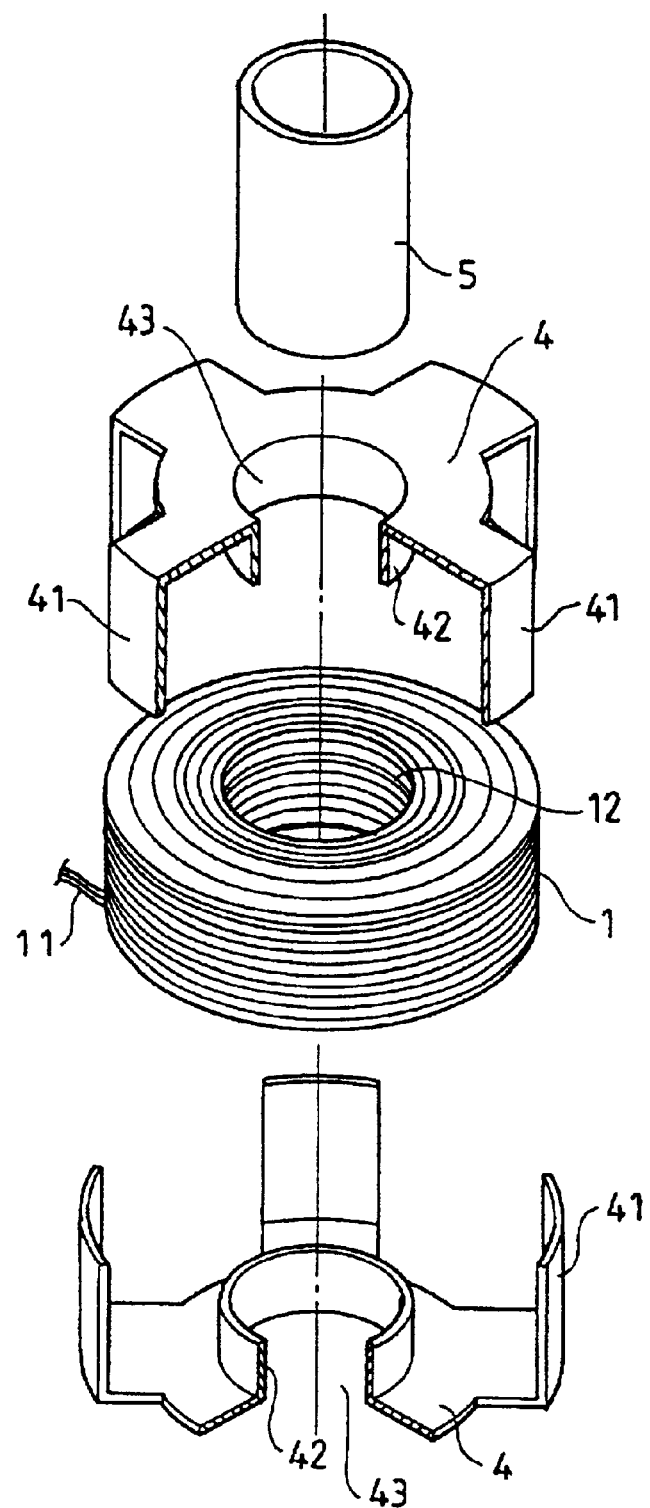
FIG. 5 is an exploded perspective view of a stator of a brushless direct current motor in accordance with a second embodiment of the present invention.

Referring to FIG. 5, a stator structure of a brushless direct current motor in accordance with a second embodiment of the present invention primarily comprises a coil set 1, two pole plates 4, and a combination member 5.

The coil set 1 is the same as that of the first embodiment, and may be wound, impregnated and plated, or coated with an insulating layer. In addition, the coil set 1 has a wiring head 11 for connecting the electric power. The coil set 1 may form a ring body having a central hole 12.

The at least two pole plates 4 are made of magnetically conducting material, and may be combined on the two end faces of the coil set 1. Each pole plate 4 has pole faces 41 and a magnetically conducting plate 42. The pole faces 41 are located on the circumference of the larger diameter of the pole plate 4, and may be induced with the annular permanent magnet provided by the rotor. The magnetically conducting plate 42 is located adjacent to the circumference of the smaller diameter of the center of the pole plate 4. The magnetically conducting plate 42 may form a central hole 43 which allow the combination member 5 to form a close fit by the difference of larger and smaller diameters. In the preferred embodiment, the pole faces 41 at the two sides of the coil set 1 are arranged in a staggered manner.

The combination member 5 is made of magnetically conducting material, and may be closely combined with the magnetically conducting plate 42 of the upper and lower pole plates 4, so that the pole plate 4 may be fixed. In addition, the combination member 5 may also strengthen the magnetically conducting effect.

Figure 6:
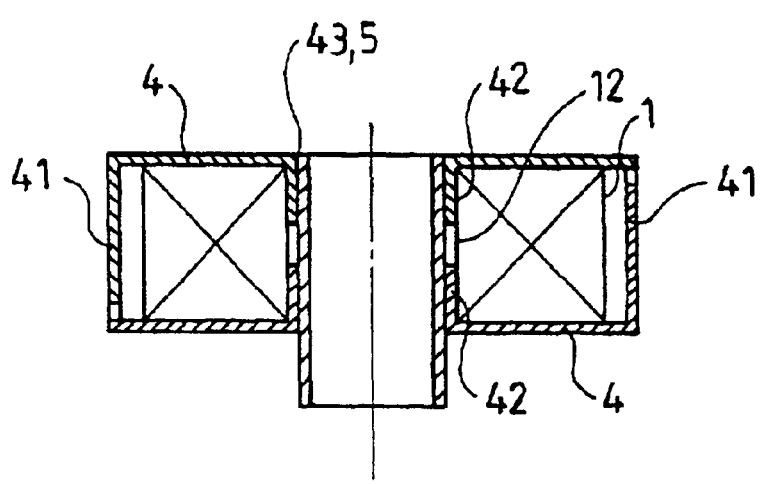
FIG. 6 is a cross-sectional assembly view of the stator of a brushless direct current motor as shown in FIG. 5.

The stator of the present preferred embodiment may be made by the following steps:

(1) The coil set 1 is wound to predetermined turns, thereby forming a ring body having a central hole 12, and may be performed by an insulation process;

(2) The at least two pole plates 4 are respectively mounted on the two end faces of the coil set 1, the pole faces 41 of each pole plate 4 encompass the periphery of the coil set 1 in a staggered manner, the magnetically conducting plate 42 of each pole plate 4 is mounted in the central hole 12 of the coil set 1, and the wiring head 11 of the coil set 1 is drawn outside of the pole plate 4;

(3) The combination member 5 is mounted in the magnetically conducting plate 42 of each pole plate 4 in a close fit manner, thereby forming a stator as shown in FIG. 6.

Figure 7:
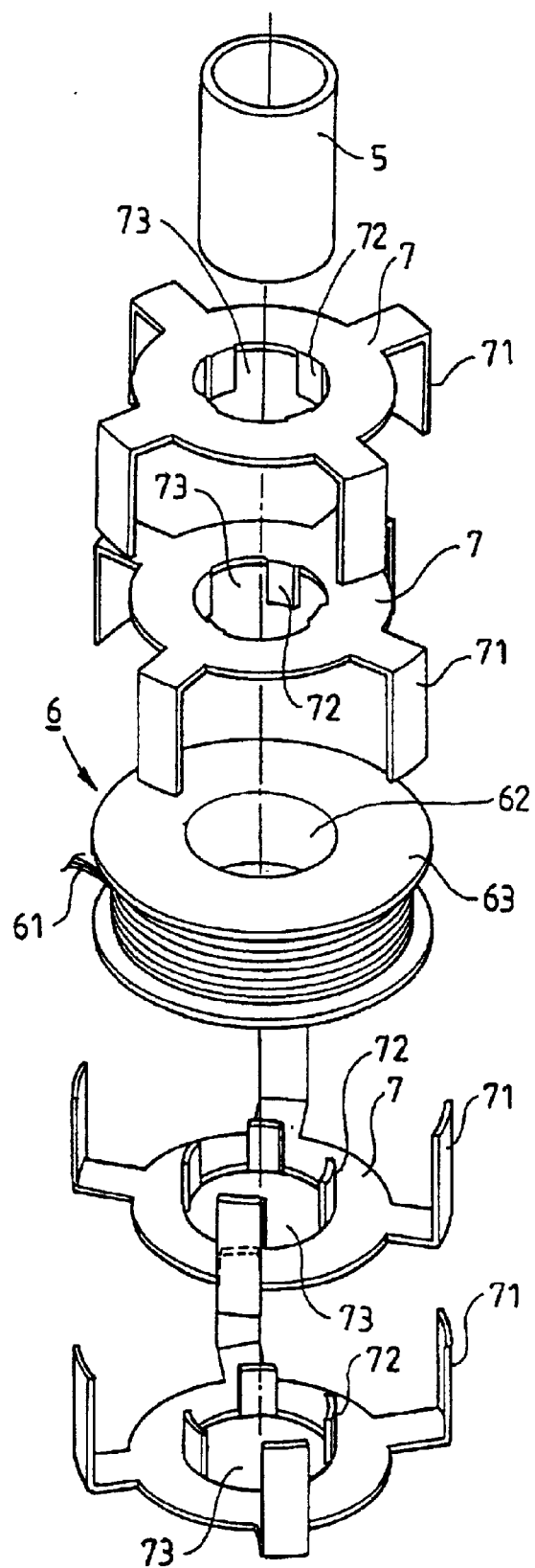
FIG. 7 is an exploded perspective view of a stator of a brushless direct current motor in accordance with a third embodiment of the present invention.

Referring to FIG. 7, a stator structure of a brushless direct current motor in accordance with a third embodiment of the present invention primarily comprises a coil set 6, four pole plates 7, and a combination member 5.

The coil set 6 may be wound around an insulating layer 63. In addition, the coil set 6 has a wiring head 61 for connecting the electric power. The insulating layer 63 has a central hole 62.

The pole plates 7 are made of magnetically conducting material, and are respectively mounted on the two end faces of the coil set 6. Each pole plate 7 has multiple pole faces 71 and multiple magnetically conducting plates 72. Each pole face 71 is located on the circumference of the larger diameter of the pole plate 7, and may be induced with the annular permanent magnet provided by the rotor. Each magnetically conducting plate 72 is located in the inner wall of the central hole 62 of the insulating layer 63. The magnetically conducting plates 72 may form a central hole 73 which allow the combination member 5 to form a close fit by the difference of larger and smaller diameters. In the preferred embodiment, the two end faces of the coil set 6 are respectively fitted with two pole plates 7. The pole faces 71 of the two pole plates 7 at the same side may be adjacent to each other or overlap each other. The magnetically conducting plates 72 of the two pole plates 7 at the same side may be adjacent to each other or overlap each other. The pole faces 71 of the two pole plates 7 at the other side of the coil set 6 are arranged in a staggered manner.

The combination member 5 is made of magnetically conducting material, and may be closely combined with the magnetically conducting plate 72 of the upper and lower pole plates 7, so that the pole plate 7 may be fixed. In addition, the combination member 5 may also strengthen the magnetically conducting effect.

The stator of the present preferred embodiment may be made by the following steps:

(1) The coil set 6 is wound around the insulating layer 63 to predetermined turns, and the insulating layer 63 has a central hole 62;

(2) The magnetically conducting plates 72 of each pole plate 7 are respectively mounted in the central hole 62 of the insulating layer 63, the pole faces 71 of each pole plate 7 encompass the outer periphery of the coil set 6, the wiring head 61 of the coil set 6 is drawn outside of the pole plate 7, and when at least two pole plates 7 are mounted on the two sides of the coil set 6, the pole faces 71 and the magnetically conducting plates 72 of each the two pole plates 7 at the same side may be adjacent to each other or overlap each other; and the pole faces 71 and the magnetically conducting plates 72 of each the two pole plates 7 at two different sides may be arranged in a staggered manner;

(3) The combination member 5 is mounted in the magnetically conducting plate 72 of each pole plate 7 in a close fit manner, thereby forming a stator.

The stator of the present embodiment has larger pole faces 71 and magnetically conducting plates 72 to combine with the combination member 5, thereby forming a larger magnetically conducting passage. Thus, the stator has a larger magnetic flux, and may provide a larger rotational torque to the rotor.

Accordingly, the stator structure of a brushless direct current motor in accordance with the present invention has a simple construction, and the pole face of the stator has a larger sensing area. After the combination member of the stator is combined with the magnetically conducting ring (or plate) of the pole plate, a larger thickness may be formed. Thus, the magnetic flux may be increased. Therefore, the stator may provide a larger rotational torque to the rotor.

In addition, in the manufacturing method of the stator structure of a brushless direct current motor in accordance with the present invention, the stator has a simple construction. Thus, the manufacturing method of the stator structure of a brushless direct current motor in accordance with the present invention is more easy, thereby accelerating the manufacturing velocity and productivity of the stator product, so that the cost of fabrication of the stator may be reduced greatly.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A stator of a brushless motor having an inner rotor, comprising:

a coil set, having an insulating layer and a central hole, said coil set having a wiring head for connecting an electric power;

at least two pole plates, mounted on two end faces of said coil set respectively, each pole plate having inner pole faces and outer magnetic ally conducting rings, said inner pole faces of said two pole plates arranged in a staggered manner, said inner pole faces of each pole plate mounted in said central hole of said coil set to face a permanent magnet of the inner rotor, and said outer magnetically conducting rings of each pole plate arranged on an outer circumference of said pole plate; and a combination member made of magnetically conductive material, said combination member being mounted to and closely combined with each of said outer magnetically conducting rings of each pole plate, said combination member encompassing said outer magnetically conducting rings to enhance magnetic conduction and isolation of the stator from other components of the motor.

2. A stator of a brushless motor having an outer rotor, comprising:

a coil set, having an insulating layer and a central hole, said coil set having a wiring head for connecting an electric power;

at least two pole plates, mounted on two end faces of said coil set respectively, each pole plate having outer pole faces and inner magnetically conducting plates, said outer pole faces and said inner magnetically conducting plates arranged in a staggered manner respectively, said pole faces of each pole plate mounted on an outer periphery of said coil set, and said inner magnetically conducting plates of each pole plate mounted in said central hole of said coil set to face a permanent magnet of the outer rotor; and a combination member made of magnetically conductive material, said combination member being mounted to and closely combined with each of said inner magnetically conducting plates of each pole plate such that said combination member extends through an entire thickness of said stator and abuts against said inner magnetically conducting plates for enhancing magnetic conduction and isolation.

3. The stator of a brushless direct current motor as claimed in claim 2, wherein a number of said pole plates mounted on two end faces of said coil set is more than two, and said pole faces of each of said pole plates at the same side are adjacent to each other, locally overlap each other, or overlap each other.

4. The stator of a brushless direct current motor as claimed in claim 2, wherein a number of said pole plates mounted on two end faces of said coil set is more than two, and said magnetically conducting plates of each of said pole plates on the same side are adjacent to each other, locally overlap each others or overlap each other.

* * * * *